US009131402B2

(12) United States Patent
Wang

(10) Patent No.: US 9,131,402 B2
(45) Date of Patent: Sep. 8, 2015

(54) METHODS, SYSTEMS, AND MEDIA FOR DETECTING USAGE OF A RADIO CHANNEL

(75) Inventor: Xiaodong Wang, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 72 days.

(21) Appl. No.: 13/993,049

(22) PCT Filed: Dec. 12, 2011

(86) PCT No.: PCT/US2011/064434
§ 371 (c)(1),
(2), (4) Date: Oct. 3, 2013

(87) PCT Pub. No.: WO2012/079080
PCT Pub. Date: Jun. 14, 2012

(65) Prior Publication Data
US 2014/0024316 A1 Jan. 23, 2014

Related U.S. Application Data

(60) Provisional application No. 61/422,114, filed on Dec. 10, 2010.

(51) Int. Cl.
H04B 1/00 (2006.01)
H04B 15/00 (2006.01)
H04W 24/08 (2009.01)
H04L 5/00 (2006.01)
H04L 27/00 (2006.01)
(Continued)

(52) U.S. Cl.
CPC ............... *H04W 24/08* (2013.01); *H04L 5/00* (2013.01); *H04L 27/0006* (2013.01); *H04W 16/14* (2013.01); *H04L 5/0023* (2013.01); *H04W 24/10* (2013.01)

(58) Field of Classification Search
USPC ........... 455/446–451, 452.1, 452.2, 453, 454, 455/455, 41.2, 63.1, 67.11, 67.13, 68, 69; 370/445, 447, 448
See application file for complete search history.

(56) References Cited

U.S. PATENT DOCUMENTS 6,018,543 A * 1/2000 Blois et al. .................... 375/133
6,456,239 B1 9/2002 Werb et al.
(Continued)

OTHER PUBLICATIONS

"Channel Model Implementations of Winner", TKK.fi, Apr. 10, 2007, pp. 1-3, available at http://www.tkk.fi/Units/Radio/scm/.
(Continued)

*Primary Examiner* — Tuan A Tran
(74) *Attorney, Agent, or Firm* — Byrne Poh LLP

(57) ABSTRACT

Methods, systems, and media for detecting usage of a radio channel are provided. In some embodiments, methods for detecting usage of a radio channel are provided, the methods comprising: collecting noise samples on the radio channel from a radio receiver; determining a noise empirical cumulative distribution function using a hardware processor; collecting signal samples on the radio channel from the radio receiver; determining a signal empirical cumulative distribution function using a hardware processor; calculating a largest absolute difference between the noise empirical cumulative distribution function and the signal empirical cumulative distribution function using a hardware processor; and determining that the radio channel is being used when the largest absolute difference is greater than a threshold using a hardware processor.

21 Claims, 3 Drawing Sheets

(51) Int. Cl.
*H04W 16/14* (2009.01)
*H04W 24/10* (2009.01)

(56) References Cited

U.S. PATENT DOCUMENTS

| | | | |
|---|---|---|---|
| 6,873,662 B2 * | 3/2005 | Oh et al. | 375/317 |
| 6,915,123 B1 | 7/2005 | Daudelin et al. | |
| 7,065,351 B2 | 6/2006 | Carter et al. | |
| 7,327,795 B2 * | 2/2008 | Oprea | 375/260 |
| 7,327,800 B2 * | 2/2008 | Oprea et al. | 375/267 |
| 7,388,933 B2 * | 6/2008 | Oh et al. | 375/317 |
| 7,519,968 B2 | 4/2009 | Koyama et al. | |
| 7,747,224 B2 * | 6/2010 | McCallister et al. | 455/67.11 |
| 8,218,671 B2 | 7/2012 | Fukawa et al. | |
| 8,265,131 B2 * | 9/2012 | Ito et al. | 375/229 |
| 8,265,209 B2 * | 9/2012 | Kim | 375/346 |
| 8,379,709 B2 * | 2/2013 | Hui et al. | 375/232 |
| 8,422,595 B2 * | 4/2013 | Jiang | 375/326 |
| 8,532,202 B2 | 9/2013 | Van Zelst | |
| 8,738,053 B2 * | 5/2014 | Zhang et al. | 455/501 |
| 8,817,926 B2 * | 8/2014 | Hui et al. | 375/346 |
| 8,982,976 B2 | 3/2015 | Suh et al. | |
| 2002/0172166 A1 * | 11/2002 | Arslan et al. | 370/317 |
| 2005/0185666 A1 | 8/2005 | Raya et al. | |
| 2006/0189322 A1 | 8/2006 | Conte et al. | |
| 2007/0066229 A1 * | 3/2007 | Zhang et al. | 455/67.11 |
| 2007/0230335 A1 | 10/2007 | Sang et al. | |
| 2007/0254590 A1 * | 11/2007 | Lopez | 455/63.1 |
| 2008/0181252 A1 | 7/2008 | Rofougaran | |
| 2009/0285276 A1 | 11/2009 | Heikkila | |
| 2010/0069013 A1 | 3/2010 | Chaudhri et al. | |
| 2010/0135226 A1 | 6/2010 | Chandramouli et al. | |
| 2011/0022342 A1 | 1/2011 | Pandharipande et al. | |
| 2011/0038272 A1 * | 2/2011 | Hadad et al. | 370/252 |
| 2011/0096858 A1 | 4/2011 | Klimer | |
| 2011/0191281 A1 | 8/2011 | Park et al. | |
| 2011/0223910 A1 | 9/2011 | Xin et al. | |
| 2012/0058794 A1 * | 3/2012 | Valentine | 455/513 |

OTHER PUBLICATIONS

Ask, J., et al., "Home Wi-Fi: Consumer Security Fears Help Drive Adoption of New Devices", Feb. 25, 2005, Jupiter Research.
Ask, J., et al., "Home Wireless Network Forecast", Oct. 29, 2004, Jupiter Research.
Ask, J., et al., "Public Wi-Fi: Capturing Paying Customers in an Increasingly Competitive Space", vol. 3, Mar. 23, 2006, Jupiter Research.
Ask, J., et al., "US Home Wireless Network Forecast, 2005 to 2010", Sep. 28, 2005, Jupiter Research.
Bianchi, G. and Tinnirello, I., "Kalman Filter Estimation of the Number of Competing Terminals in an IEEE 802.11 Network", In Proceedings of the 22nd Annual Joint Conference of the IEEE Computer and Communications Societies (INFOCOM'03), San Franciso, CA, USA, Mar. 30-Apr. 3, 2003.
Bianchi, G., "Performance Analysis of the IEEE 802.11 Distributed Coordination Function", In IEEE Journal on Selected Areas in Communications, vol. 18, No. 3, Mar. 2000, pp. 535-547.
Buchegger, S., et al., "Nodes Bearing Grudges: Towards Routing Security, Fairness, and Robustness in Mobile Ad Hoc Networks", In Proceedings 10th Euromicro Workshop Parallel, Distributed and Network-Based Processing, Jan. 2002, pp. 403-410.
Buchegger, S., et al., "Performance Analysis of the Confidant Protocol", In Proceedings of MobiHoc'02, Jun. 2002, pp. 226-236.
Buttyan L, et al., "Report on a Working Session on Security in Wireless Ad Hoc Networks", Mobile Computing and Communications Review, 2002, vol. 6, No. 4.
Cagalj M, et al., "On Cheating in CSMA/CA Ad Hoc Networks," Mar. 2004.
Cardenas, A., et al., "Detection and Prevention of MAC Layer Misbehavior in Ad Hoc Networks", In SASN'04: Proceedings of the 2nd ACM Workshop on Security of Ad Hoc and Sensor Networks, 2004, pp. 17-22.

Cardoso, L.S., et al., "Cooperative Spectrum Sensing Using Random Matrix Theory", in 3rd International Symposium on Wireless Pervasive Computing (ISWPC), May 7-9, 2008, pp. 334-338.
Cervin, A. and Henningsson, T., "Scheduling of Event-Triggered Controllers on a Shared Network", In Proceedings of the 47th IEEE Conference on Decision and Control (CDC '08), Cancún, MX, Dec. 9-11, 2008, pp. 3601-3606.
Chaudhari, S., et al., "Autocorrelation-Based Decentralized Sequential Detection of OFDM Signals in Cognitive Radios", In IEEE Transactions on Signal Processing, vol. 57, No. 7, Jul. 2009, pp. 2690-2700.
Chaudhari, S., et al., "Distributed Autocorrelation-Based Sequential Detection of OFDM Signals in Cognitive Radios", In Proceedings of the 3rd International Conference on Cognitive Radio Oriented Wireless Networks and Communications, Singapore, May 15-17, 2008, pp. 1-6.
Chen, H.S., et al., "Signature Based Spectrum Sensing Algorithms for IEEE 802.22 WRAN", In Proceedings of the IEEE Conference on Communicationsm, Jun. 24-28, 2007, Glasgow, GB, pp. 6487-6492.
European Telecommunications Standards Institute, "Spatial Channel Model for Multiple Input Multiple Output (MIMO) Simulations, 3GPP TR 25.966 V8.0.0", Jan. 30, 2009, pp. 1-42, available at: http://www.etsi.org/deliver/etsi_tr/125900_125999/125996/08.00.00_60/tr_125996v080000p.pdf.
Farhang-Boroujeny, B., "Filter Bank Spectrum Sensing for Cognitive Radios", IEEE Transactions on Signal Processing, vol. 56, No. 5, May 2008, pp. 1801-1811.
Fasano, G.and Franceschini, A., "A Multidimensional Version of the Kolmogorov-Smirnov Test", Monthly Notices of the Royal Astronomical Society, vol. 225, Mar. 1, 1987, pp. 155-170.
Fellouris, G. and Moustakides, G.V., "Decentralized Sequential Hypothesis Testing Using Asynchronous Communication", In IEEE Transactions on Information Theory, vol. 57, No. 1, Jan. 2011, pp. 534-548.
Font-Segura, J. and Wang, X., "GLRT-Based Spectrum Sensing for Cognitive Radio with Prior Information", In IEEE Transactions on Communications, vol. 58, No. 7, Jul. 2010, pp. 2137-2146.
Ganesan, G. and Li, Y., "Cooperative Spectrum Sensing in Cognitive Radio, Part 1: Two User Networks", In IEEE Transactions on Wireless Communications, vol. 6, No. 6, Jun. 2007, pp. 2204-2213.
Ghasemi, A. and Sousa, E., "Spectrum Sensing in Cognitive Radio Networks: Requirements, Challenges and Design Trade-Offs", IEEE Communications Magazine, vol. 46, No. 4, Apr. 2008, pp. 32-39.
Haykin, S., et al., "Spectrum Sensing for Cognitive Radio", In Proceedings of the IEEE, vol. 97, No. 5, May 2009, pp. 849-877.
Hernandez, M.A.L., et al., "New Spectral Estimation Based on Filterbank for Spectrum Sensing", IEEE International Conference on Acoustics, Speech and Signal Processing (ICASSP 2008), Mar. 31-Apr. 4, 2008, Las Vegas, NV, USA, pp. 3509-3512.
International Patent Application No. PCT/US2007/011895, filed May 18, 2007.
International Patent Application No. PCT/US2011/064434, filed Dec. 12, 2011.
International Patent Application No. PCT/US2013/030011, filed Mar. 8, 2013.
International Preliminary Report on Patentability dated Sep. 9, 2014 in Internatoinal Patent Application No. PCT/US2013/030011.
International Preliminary Report on Patentability dated Jun. 20, 2013 in International Patent Application No. PCT/US2011/064434.
International Preliminary Report on Patentability in International Patent Application No. PCT/US2007/011895, filed May 18, 2007, mailed Dec. 3, 2008.
International Search Report and Written Opinion dated Sep. 26, 2008 in International Patent Application No. PCT/US2007/011895.
International Search Report dated Mar. 1, 2012 in International Patent Application No. PCT/US2011/064434.
International Search Report dated May 20, 2013 in International Patent Application No. PCT/US2013/030011, filed Mar. 8, 2013.
Jithin, K.S. and Sharma, V., "Novel Algorithms for Distributed Sequential Hypothesis Testing", In Proceedings of the 49th Annual Allerton Conference on Communication, Control, and Computing, Monticello, IL, USA, Sep. 28-30, 2011, pp. 1529-1536.

(56) References Cited

OTHER PUBLICATIONS

Khamis, H., "The Delta-Corrected Kolmogorov-Smirnov Test for Goodness of Fit", In Journal of Statistical Planning and Inference, vol. 24, Mar. 1990, pp. 317-335.

Khamis, H., "The Two-Stage Delta-Corrected Kolmogorov-Smirnov Test", Journal of Applied Statistics, vol. 27, No. 4, Apr. 2000, pp. 439-450.

Kim, S.J. and Giannakis, G.B., "Sequential and Cooperative Sensing for Multi-Channel Cognitive Radios", In IEEE Transactions on Signal Processing, vol. 58, No. 8, Aug. 2010, pp. 4239-4253.

Kundargi, N. and Tewfik, A.H., "Doubly Sequential Energy Detection for Distributed Dynamic Spectrum Access", In Proceedings of the IEEE International Conference on Communications, Cape Town, ZA, May 23-27, 2010, pp. 1-5.

Kyasanur P, et al., "Selfish MAC Layer Misbehavior in Wireless Networks," In IEEE Transactions on Mobile Computing, vol. 4, No. 5, 2005, pp. 502-516.

Lai, L., et al., "Quickest Detection in Cognitive Radio: A Sequential Change Detection Framework", In Proceedings of the Global Telecommunications Conference, New Orleans, LA, USA, Nov. 30-Dec. 4, 2008, pp. 1-5.

Lopez Toledo, A. and Wang, X., "A Robust Kolmogorov-Smirnov Detector for Misbehavior in IEEE 802.11 DCF", In Proceedings of the IEEE International Conference on Communications, Glasgow, Scotland, GB, Jun. 24-28, 2007, pp. 1564-1569.

Lopez Toledo, A. and Wang, X., "Robust Detection of Selfish Misbehavior in Wireless Networks", In IEEE Journal on Selected Areas in Communications, vol. 25, No. 6, Aug. 2007, pp. 1124-1134.

Lopez Toledo, A., et al., "Adaptive Optimization of IEEE 802.11 DCF Based on Bayesian Estimation of the Number of Competing Terminals", IEEE Transactions on Mobile Computing, September, vol. 5, No. 9, 2006.

Lopez Toledo, A., et al., "Optimizing IEEE 802.11 DCF Using Bayesian Estimators of the Network State," In Proceedings of IEEE International Conference Acous., Speech, Sig. Proc. (ICASSP'05), Mar. 2005, Philadelphia, PA, vol. 5, pp. 933-936.

Lunze, J. and Lehmann, D., "A State-Feedback Approach to Event-Based Control", In Automatica, vol. 46, No. 1, Jan. 2010, pp. 211-215.

Ma, J., et al., "Signal Processing in Cognitive Radio", In Proceedings of the IEEE, vol. 97, No. 5, May 2009, pp. 805-823.

Ma, J., et al., "Soft Combination and Detection for Cooperative Spectrum Sensing in Cognitive Radio Networks", In IEEE Transactions on Wireless Communications, vol. 7, No. 11, Nov. 2008, pp. 4502-4507.

Mackenzie, A., and Wicker, S.B., "Stability of Multipacket Slotted Aloha with Selfish Users and Perfect Information", In Proceedings of IEEE Infocom'03, San Francisco, CA, USA, Mar. 30-Apr. 3, 2003, pp. 1583-1590.

Mackenzie, A., et al., "Game Theory and the Design of Self-Configuring, Adaptive Wireless Networks", IEEE Communications Magazine, Nov. 2001, vol. 39, No. 11, pp. 126-131.

Massey, F., et al., "The Kolmogorov-Smirnov Test for Goodness of Fit", Journal of the American Statistical Association, Mar. 1951, vol. 46, No. 253, pp. 68-78.

McCanne, S., et al., "Network Simulator 2", last updated Jan. 2, 2012, pp. 1-9, available at: http://www.isi.edu/nsnam/ns.

Medepalli, K., et al., "Voice Capacity of IEEE 802.11a and 802.11g Wireless LANs," In Proceedings of Globecom, Nov. 29-Dec. 3, 2004, Dallas, TX, USA, pp. 1459-1553.

Middleton, D., "Non-Gaussian Noise Models in Signal Processing for Telecommunications: New Methods an Results for Class A and Class B Noise Models", IEEE Transactions on Information Theory, vol. 45, No. 4, May 1999, pp. 1129-1149.

Miskowicz, M., "The Event-Triggered Sampling Optimization Criterion for Distributed Networked Monitoring and Control Systems", In Proceedings of the IEEE International Conference on Industrial Technology, vol. 2, Maribor, SI, Dec. 10-12, 2003, pp. 1083-1088.

Moustakides, G.V., et al., "A Numerical Approach to Performance Analysis of Quickest Change-Point Detection Procedures", In Statistica Sinica, vol. 21, No. 2, Apr. 2011, pp. 571-596.

Nguyen-Thanh, N., "Log-Likelihood Radio Optimal Quantizer for Cooperative Spectrum Sensing in Cognitive Radio", In IEEE Communications Letters, vol. 15, No. 3, Mar. 2011, pp. 317-319.

Office Action dated May 15, 2009 in U.S. Appl. No. 11/796,499.

Office Action dated Aug. 28, 2008 in U.S. Appl. No. 11/796,499.

Panchenko, D., "Section 13: Kolmogorov-Smirnov Test," In MIT Lecture Notes, Sep. 2006, pp. 83-90, available at: http://ocw.mit.edu/NR/rdonlyres/Mathematics/18-443Fall-2006/DB432998-421E-4FE3-8B59-FA3859D4F445/0/lecture14.pdf.

Peacock, J., "Two-Dimensional Goodness-of-Fit Testing in Astronomy", In Monthly Notices of the Royal Astronomical Society, vol. 202, Feb. 1983, pp. 615-627.

Penna, F., et al., "Cooperative Spectrum Sensing Based on the Limiting Eigenvalue Ratio Distribution in Wishart Matrices", In IEEE Communications Letters, vol. 13, No. 7, Jul. 2009, pp. 507-509.

Quan, Z., et al., "Optimal Linear Cooperation for Spectrum Sensing in Cognitive Radio Networks", In IEEE Journal of Selected Topics in Signal Processing, vol. 2, No. 1, Feb. 2008, pp. 28-40.

Quan, Z., et al., "Optimal Spectral Feature Detection for Spectrum Sensing at Very Low SNR", In IEEE Transactions on Communications, vol. 59, No. 1, Jan. 2011, pp. 201-212.

Radosavac, S., et al., "A Framework for MAC Protocol Misbehavior Detection in Wireless Networks", In Proceedings of the 4th ACM Workshop on Wireless Security, Sep. 2, 2005, pp. 33-42.

Raya, M., et al., "DOMINO: A System to Detect Greedy Behavior in IEEE 802.11 Hotspots", In Proceedings of the 2nd International Conference on Mobile Systems, Applications and Services, Boston, MA, USA, Jun. 6-9, 2004, pp. 84-97.

Sahai, A. and Cabric, D., "Spectrum Sensing: Fundamental Limits and Practical Challenges", Presentation, In Proceedings of the First IEEE International Symposium on New Frontiers in Dynamic Spectrum Access Networks (DYSPAN'05), Baltimore, MD, USA, Nov. 8-11, 2005, pp. 1-138.

Sebastian, I., et al., "Home Wi-Fi Security: Understanding Consumer Behavior and Impact on Wi-Fi Adoption", Jun. 22, 2006, Jupiter Research, pp. 1-5.

Shei, Y. and Su, Y.T., "A Sequential Test Based Cooperative Spectrum Sensing Scheme for Cognitive Radios", In Proceeding of the IEEE 19th International Symposium on Personal, Indoor and Mobile Radio Communications (PIMRC'08), Cannes, FR, Sep. 15-18, 2008, pp. 1-5.

Sun, C., et al., "Cooperative Spectrum Sensing for Cognitive Radios under Bandwidth Constraints", In Proceedings of the IEEE Wireless Communications and Networking Conference (WCNC'07), Hong Kong, CN, Mar. 11-15, 2007, pp. 1-5.

Sutton, P.D., et al., "Cyclostationary Signatures in Practical Cognitive Radio Applications", IEEE Journal on Selected Areas in Communications, vol. 26, No. 1, Jan. 2008, pp. 13-24.

Tsitsiklis, J.N., "Extremal Properties of Likelihood-Ratio Quantizers", In IEEE Transactions on Communications, vol. 41, No. 4, Apr. 1993, pp. 550-558.

U.S. Appl. No. 60/810,002, filed May 31, 2006.

U.S. Appl. No. 61/608,489, filed Mar. 8, 2012.

Unnikrishnan, J. and Veeravalli, V.V., "Cooperative Spectrum Sensing and Detection for Cognitive Radio", In Proceedings of the Global Communications Conference (GLOBECOM'07), Washington, DC, USA, Nov. 26-30, 2007, pp. 2972-2976.

Vercauteren, T., et al., "Batch and Sequential Bayesian Estimators of the Number of Active Terminals in an IEEE 802.11 Network", In IEEE Transactions on Signal Processing, vol. 55, No. 2, Feb. 2007, pp. 437-450.

Wald, A. and Wolfowitz, J., "Optimum Character of the Sequential Probability Ratio Test", In Annals of Mathematical Statistics, vol. 19, No. 3, Sep. 1948, pp. 326-339.

Wang, C., et al., "A New Collision Resolution Mechanism to Enhance the Performance of IEEE 802.11 DCF", In IEEE Transactions in Vehicular Technology, vol. 53, No. 4, Jul. 2004, pp. 1235-1246.

Written Opinion in International Patent Application No. PCT/US2011/064434, filed Dec. 12, 2011, mailed Mar. 1, 2012.

(56) References Cited

OTHER PUBLICATIONS

Written Opinion in International Patent Application No. PCT/US2013/030011, filed Mar. 8, 2013, mailed May 20, 2013.

Xin, Y. and Zhang, H., "A Simple Sequential Spectrum Sensing Scheme for Cognitive Radio", Technical Report, NEC Laboratories, May 28, 2009, pp. 1-29, available at: http://arxiv.org/abs/0905.4684.

Yang, X., et al., "Trace Based Semi-blind and Blind Spectrum Sensing Schemes for Cognitive Radio", In Proceedings of the IEEE Conference on Communications, May 23-27, 2010, Cape Town, ZA, pp. 1-5.

Yilmaz, Y., "Spectrum Sensing via Event-Triggered Sampling", In Proceedings of the Forty-Fifth Asilomar conference on Signals, Systems & Computers (ASILOMAR'11), Pacific Grove, CA, USA, Nov. 6-9, 2011, pp. 1420-1424.

Yücek, T. and Arslan, H., "A Survey of Spectrum Sensing Algorithms for Cognitive Radio Applications", In IEEE Communications Surveys & Tutorials, vol. 11, No. 1, Jan. 2009, pp. 116-130.

Zahabi, S.J. and Tadaion, A.A., "Local Spectrum Sensing in Non-Gaussian Noise", In Proceedings of the 17th IEEE International Conference on Telecommunications, Apr. 4-7, 2010, Doha, QA, pp. 843-847.

Zeng, Y. and Liang, Y.C., "Eigenvalue-Based Spectrum Sensing Algorithms for Cognitive Radio", IEEE Transactions on Commununications, vol. 57, No. 6, Jun. 2009, pp. 1784-1793.

Zhang, G., et al., "Fast and Robust Spectrum Sensing via Kolmogorov-Smirnov Test", In IEEE Transactions on Communications, vol. 58, No. 12, Dec. 2010, pp. 3410-3416.

Office Action dated Mar. 6, 2015 in U.S. Appl. No. 14/383,815.

\* cited by examiner

METHODS, SYSTEMS, AND MEDIA FOR DETECTING USAGE OF A RADIO CHANNEL

CROSS REFERENCE TO RELATED APPLICATION

This application claims the benefit of U.S. Provisional Patent Application No. 61/422,114, filed Dec. 10, 2010, which is hereby incorporated by reference herein in its entirety.

STATEMENT REGARDING FEDERALLY SPONSORED RESEARCHED OR DEVELOPMENT

This invention was made with government support under Grant No. N00014-08-1-0318 awarded by the United States Navy. The government has certain rights to the invention.

BACKGROUND

To cope with the recent reality of stringent shortage in frequency spectrum due to the proliferation of wireless services, cognitive radio has been considered as an attractive technique to improve spectrum utilization for future wireless systems. In cognitive radio networks, one important function of secondary transceivers is to determine when primary transceivers are utilizing a channel, and to access the channel in such a way that it causes little performance degradation to the primary transceivers. Previous attempts at detecting the usage of a channel by one or more primary transceivers have had limited performance, especially at low signal-to-noise ratios.

SUMMARY

In accordance with some embodiments, methods, systems, and media for detecting usage of a radio channel are provided. In some embodiments, methods for detecting usage of a radio channel are provided, the methods comprising: collecting noise samples on the radio channel from a radio receiver; determining a noise empirical cumulative distribution function using a hardware processor; collecting signal samples on the radio channel from the radio receiver; determining a signal empirical cumulative distribution function using a hardware processor; calculating a largest absolute difference between the noise empirical cumulative distribution function and the signal empirical cumulative distribution function using a hardware processor; and determining that the radio channel is being used when the largest absolute difference is greater than a threshold using a hardware processor.

In some embodiments, systems for detecting usage of a radio channel are provided, the systems comprising: a radio receiver; and at least one hardware processor that: collects noise samples on the radio channel from the radio receiver; determines a noise empirical cumulative distribution function; collects signal samples on the radio channel from the radio receiver; determines a signal empirical cumulative distribution function; calculates a largest absolute difference between the noise empirical cumulative distribution function and the signal empirical cumulative distribution function; and determines that the radio channel is being used when the largest absolute difference is greater than a threshold.

In some embodiments, non-transitory computer-readable media containing computer-executable instructions that, when executed by a processor, cause the processor to perform a method for detecting usage of a radio channel are provided, the method comprising: collecting noise samples on the radio channel from a radio receiver; determining a noise empirical cumulative distribution function; collecting signal samples on the radio channel from the radio receiver; determining a signal empirical cumulative distribution function; calculating a largest absolute difference between the noise empirical cumulative distribution function and the signal empirical cumulative distribution function; and determining that the radio channel is being used when the largest absolute difference is greater than a threshold.

DETAILED DESCRIPTION

In accordance with some embodiments, methods, systems, and media for detecting usage of a radio channel are provided.

In some embodiments, secondary transceivers can use the Kolmogorov-Smirnov (K-S) test to determine when primary transceivers are using a radio channel. In applying this test, these secondary transceivers can compute an empirical cumulative distribution function (CDF) of some decision statistic obtained from the received signal, and compare it with the empirical CDF of noise samples from the channel.

Figure 1:
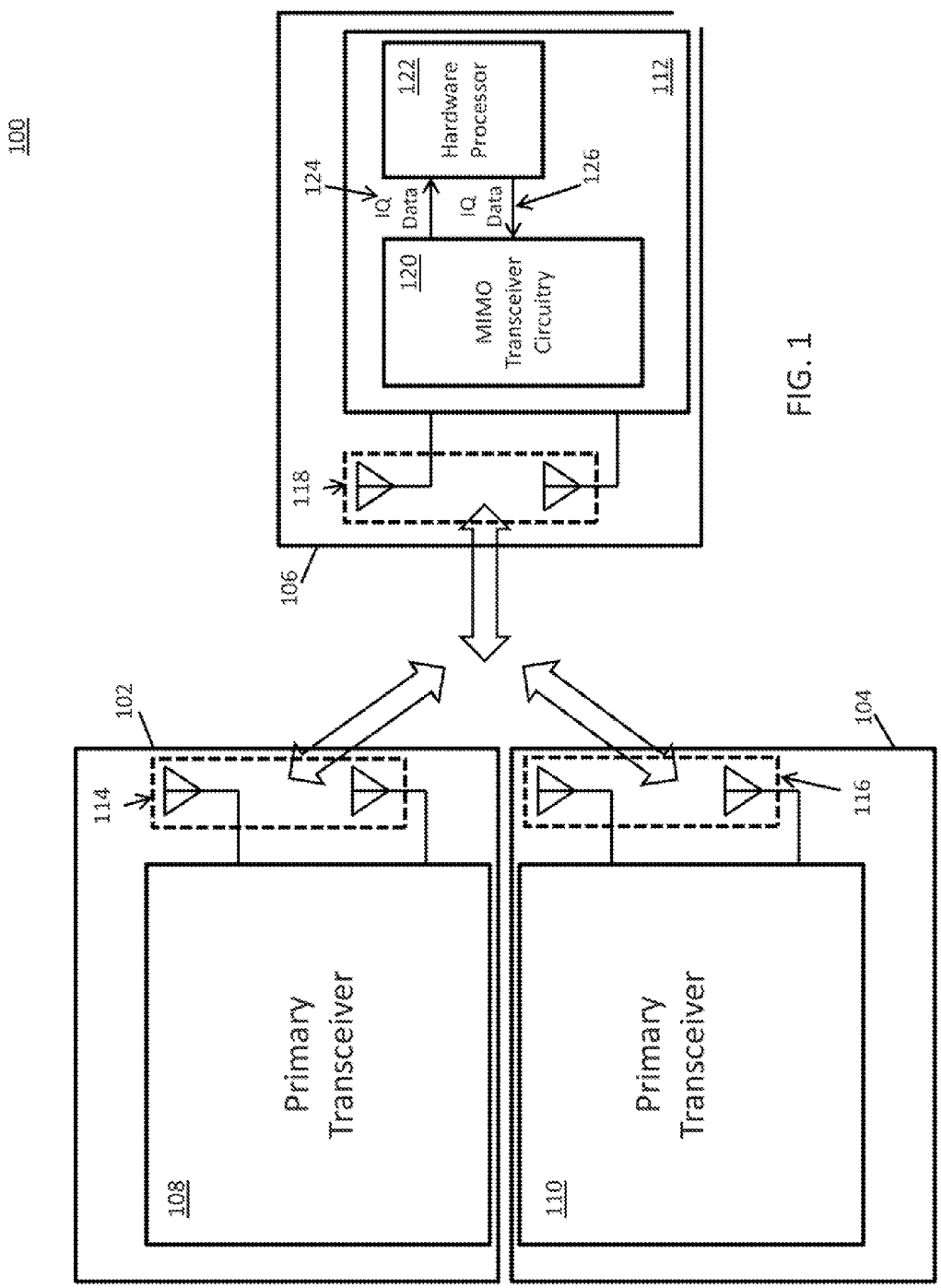
FIG. 1 is a block diagram of a cognitive radio network in accordance with some embodiments.

Turning to FIG. 1, an architecture for a cognitive radio system 100 is shown. As illustrated, system 100 may include a plurality of radios 102, 104, and 106. These radios may respectively include transceivers 108, 110, and 112 and antennas 114, 116, and 118. Each transceiver may include both a receiver and a transmitter in some embodiments. As shown, these radios may be multi-input multi-output (MIMO) transceivers where each include multiple antennas (e.g., such as two transmit antennas and four receive antennas (some of which may also be transmit antennas)). In some embodiments, these radios may transmit on any suitable frequencies (e.g., as specified in the IEEE 802.11 standards), may use any suitable modulation (e.g., such as QPSK modulation), etc.

As shown, transceivers 108 and 110 may be primary transceivers and therefore have priority in using a given radio channel on which the radios operate. When these primary transceivers are using a channel, transceiver 112, which is a secondary transceiver, may determine that it should not use the channel (e.g., not transmit on the channel). In this way, transmission from transceiver 112 will not interfere with the transmission of transceivers 108 or 110.

As also shown in FIG. 1, transceiver 112 may include MIMO transceiver circuitry 120 and a hardware processor 122. MIMO transceiver circuitry 120 may be any suitable MIMO transceiver circuitry for converting RF signals received by antennas 118 into IQ data 124 and for converting IQ data 126 into RF signals to be transmitted from antennas 118. For example, in some embodiments, MIMO transceiver circuitry 120 may be implemented using a transceiver from Analog Devices, Inc. of Norwood, Mass., or a transceiver from Maxim Integrated Products, Inc. of Sunnyvale, Calif. Hardware processor 122 may be any suitable hardware processor 122 such as any suitable microprocessor, digital signal processor, a controller, etc.

Although transceiver 112 is only shown in FIG. 1 as including MIMO transceiver 120 and hardware processor 122 for the sake of clarity, any other suitable components and/or circuitry can be included in transceiver 112. For example, transceiver 112 can include memory, communication interfaces, display controllers, input devices, etc.

Radios 102, 104, and 106 can be implemented in any suitable devices in some embodiments. For example, radios 102, 104, and/or 106 can be implemented in mobile computers, mobile telephones, mobile access cards, wireless routers, wireless access points, and/or any other suitable wireless device.

Any suitable approaches can be used by transceiver 112 to determine if a primary transceiver or 104 is using a radio channel. For example, in some embodiments, the presence of one or several primary transceivers transmitting on a given channel can be detected as usage based on signals observed by transceiver 112.

Whether a transceiver is transmitting on a channel can be determined in any suitable manner. For example, in some embodiments, mathematical models of sampled signals from a channel when a transmitter is present and when a transmitter is not present can be formed, and those models used to perform analysis on a channel under test.

More particularly, for example, when there are one or more primary transceivers transmitting on a general multiple-input multiple-output (MIMO) frequency-selective fading channel, a sampled signal y(t) received by a secondary transceiver, defined as $y[n] \triangleq y(nT_s)$ with $1/T_s$ being the sampling rate, can be modeled by the following equation (1):

$$y[n] = \sum_{k=1}^{K} \sum_{l=0}^{L-1} H_k[n,l] s_k[n-l] + v[n]. \quad (1)$$

In equation (1): K is the number of transceivers transmitting (e.g., K=2); L is the multipath channel delay spread in terms of the number of symbol intervals (e.g., L=6); $s_k[n] \in \mathbb{C}^{N_t}$ is the n-th transmitted symbol vector for the k-th primary transceiver with $N_t$ being the number of transmit antennas on that transceiver (e.g., $N_t$=2); $y[n] \in \mathbb{C}^{N_r}$ is the n-th received signal vector by the secondary transceiver with $N_r$ being the number of receive antennas on the secondary transceiver (e.g., $N_r$=6); $H_k[n,l] \in \mathbb{C}^{N_r \times N_t}$ is the time-variant MIMO channel tap matrix of the k-th transceiver; and $v[n] \in \mathbb{C}^{N_r}$ is the noise vector.

When there are no primary transceivers transmitting over the sensed channel, the sampled signal can be modeled by equation (2) that includes noise only:

$$y[n] = v[n]. \quad (2)$$

In accordance with some embodiments, if the received signal samples are denoted as $Y \triangleq \{y[n], n=1, \ldots, M\}$, the determination of whether a primary transceiver is transmitting can be performed by testing for the truth of two hypotheses. For example, in such a determination, a hypothesis $\mathcal{H}_0$ can state that no primary transceiver is transmitting and thus that Y follows the model of equation (2), and a hypothesis $\mathcal{H}_1$ can state that one or more primary transceivers are transmitting and thus that Y follows the model of equation (1).

In accordance with some embodiments, there can be several special cases of the general signal model in equation (1) that are of interest, as follows: (1) slow-fading, frequency-flat MIMO channels where L=1 and $H_k[n,0] \equiv H_k$, $\forall n$; (2) slow-fading frequency-selective MIMO channels where $H_k[n,l] \equiv H_k[l]$, $\forall n$; and (3) MEMO-OFDM channels where L=1, $H_k[n, 0]$ are obtained by the discrete Fourier transform (DFT) of the time-domain channel coefficients, and n is the subcarrier index.

The Kolmogorov-Smirnov (K-S) test is a non-parametric test of goodness of fit for a continuous cumulative distribution of data samples. It accordance with some embodiments, it can be used to approve a null hypothesis that two data populations are drawn from the same distribution to a certain required level of significance. On the other hand, failing to approve the null hypothesis can be used to show that the two data populations are from different distributions.

In accordance with some embodiments a two-sample K-S test can be used to approve or fail to approve the null hypothesis. This test can be referred to as a one dimensional (1D) test. In the two-sample K-S test, a sequence of independent and identically distributed real-valued data samples $z_1, z_2, \ldots, z_N$ with the underlying cumulative distribution function (CDF) $F_1(z)$ can be observed when one or more primary transceivers may or may not be transmitting. For example, these data samples can be observed in IQ data 124 by hardware processor 122. Another independent and identically distributed sequence of noise samples $\xi_1, \xi_2, \ldots, \xi_{N_0}$ with the underlying CDF $F_0(\xi)$ can also be observed when all transceivers are known to not be transmitting. For example, these data samples can also be observed in IQ data 124 by hardware processor 122. The null hypothesis to be tested is:

$$H_0: F_1 = F_0. \quad (3)$$

In some embodiments, in performing the K-S test, hardware processor 122 can form the empirical CDF $\hat{F}_1$ from M (e.g., 50) observed signal samples $z_1, z_2, \ldots, z_M$ using the following equation (4):

$$\hat{F}_1(z) \triangleq \frac{1}{M} \sum_{n=1}^{M} \mathbb{1}\ (z_n \leq z), \quad (4)$$

where $\mathbb{1}\ (\cdot)$ is the indicator function, which equals one if the input is true (e.g., the amplitude, the quadrature, or any other suitable characteristic of the samples $z_n$ is less than or equal to a certain threshold z) and equals zero otherwise.

Hardware processor 122 can also form the empirical CDF $\hat{F}_0$ from $M_0$ (e.g., 100) observed noise samples $\xi_1, \xi_2, \ldots, \xi_{N_0}$ using the following equation (5):

$$\hat{F}_0(\xi) \triangleq \frac{1}{M_0} \sum_{n=1}^{M_0} \mathbb{1}\ (\xi_n \leq \xi). \quad (5)$$

In some embodiments, the largest absolute difference between the two CDFs can be used as a goodness-of-fit statistic as shown in equation (6):

$$D \triangleq \sup_{z \in \mathbb{R}} |F_1(w) - F_0(w)|. \quad (6)$$

In some embodiments, this difference can be calculated by hardware processor 122 using equation (7):

$$\hat{D} \triangleq \max_i |\hat{F}_1(w_i) - \hat{F}_0(w_i)|, \quad (7)$$

for some uniformly sampled points $\{w_i\}$.

In some embodiments, the hardware processor 122 can calculate the significance level $\hat{\alpha}$ of the observed value $\hat{D}$ using equation (8):

$$\hat{\alpha} \triangleq P(D > \hat{D}) = Q\left(\left[\sqrt{\tilde{M}} + 0.12 + \frac{0.11}{\sqrt{\tilde{M}}}\right]\hat{D}\right), \quad (8)$$

with $$Q(x) \triangleq 2\sum_{m=1}^{\infty}(-1)^{m-1}e^{-2m^2x^2}, \quad (9)$$

where $\tilde{M}$ is the equivalent sample size, given by:

$$\tilde{M} = \frac{MM_0}{M + M_0}. \quad (10)$$

Note that $Q(\bullet)$ is a Monotonically Decreasing Function with $Q(0)=1$ and $Q(\infty)=0$.

In some embodiments, the hardware processor 122 can reject the hypothesis $H_0$ at a significance level $\alpha$ if $\hat{\alpha} = P(D > \hat{D}) < \alpha$. The significance level $\alpha$ is an input of the K-S test to specify the false alarm probability under the null hypothesis, i.e., $$\alpha \triangleq P(D \geq \tau | H_0), \quad (11)$$

where $\tau$ is a threshold value, that can be obtained given a level of significance $\alpha$ by solving equation (8) and (11) for $\tau$.

Note that the relationship of critical value $\tau$ and the significance level $\alpha$ can depend on equivalent sample size $\tilde{M}$.

Hence given $\alpha$, $H_0$ is accepted, i.e., $F_1 = F_0$, if $\hat{D} \leq \tau$; and otherwise $H_0$ is rejected, i.e., $F_1 \neq F_0$.

Because the signals in equation (1) are complex-valued, the corresponding distributions are two-dimensional (2D). Accordingly, in accordance with some embodiments, a two-dimensional K-S test can additionally or alternatively be used to approve or fail to approve the null hypothesis.

Consider a sequence of 2D real-valued data samples $(u_1, v_1), \ldots, (u_N, v_N)$. In the 2D K-S test, the CDFs for all four quadrants (I, II, III, and IV) of the 2D plane can be examined by the hardware processor as follows:

$$F^I(u,v) \triangleq P(U<u, V<v);$$

$$F^{II}(u,v) \triangleq P(U>u, V<v);$$

$$F^{III}(u,v) \triangleq P(U>u, V>v); \text{ and}$$

$$F^{IV}(u,v) \triangleq P(U<u, V>v). \quad (12)$$

In some embodiments, the hardware processor can calculate the four empirical CDFs for the four quadrants using all possible combinations of the 2D data samples. For example, the first quadrant empirical CDF can be calculated using equations (13):

$$\hat{F}_1^I(u,v) = \frac{1}{M^2}\sum_{(i,j)\in\{1,\ldots,M\}\times\{1,\ldots,M\}}\mathbb{I}(u_i<u)\mathbb{I}(v_j<v); \quad (13)$$

$$\hat{F}_1^{II}(u,v) = \frac{1}{M^2}\sum_{(i,j)\in\{1,\ldots,M\}\times\{1,\ldots,M\}}\mathbb{I}(u_i>u)\mathbb{I}(v_j<v);$$

-continued $$\hat{F}_1^{III}(u,v) = \frac{1}{M^2}\sum_{(i,j)\in\{1,\ldots,M\}\times\{1,\ldots,M\}}\mathbb{I}(u_i>u)\mathbb{I}(v_j>v);$$

and $$\hat{F}_1^{IV}(u,v) = \frac{1}{M^2}\sum_{(i,j)\in\{1,\ldots,M\}\times\{1,\ldots,M\}}\mathbb{I}(u_i<u)\mathbb{I}(v_j>v).$$

In some embodiments, the hardware processor can use the 2D samples directly, rather than using all possible combinations, for forming the empirical CDFs as follows using equations (14):

$$\hat{F}_1^I(u,v) = \frac{1}{M}\sum_{n=1}^{M}\mathbb{I}(u_i<u)\mathbb{I}(v_j<v); \quad (14)$$

$$\hat{F}_1^{II}(u,v) = \frac{1}{M}\sum_{n=1}^{M}\mathbb{I}(u_i>u)\mathbb{I}(v_j<v);$$

$$\hat{F}_1^{III}(u,v) = \frac{1}{M}\sum_{n=1}^{M}\mathbb{I}(u_i>u)\mathbb{I}(v_j>v);$$

and $$\hat{F}_1^{IV}(u,v) = \frac{1}{M}\sum_{n=1}^{M}\mathbb{I}(u_i<u)\mathbb{I}(v_j>v).$$

In some embodiments, the largest absolute difference between the empirical CDFs among all four quadrants under $H_0$ and $H_1$ can be calculated as follows:

$$\hat{D} = \max_{q\in\{I,II,III,IV\}}\max_{1\leq n\leq N}|\hat{F}_1^q(u_n,v_n) - \hat{F}_0^q(u_n,v_n)| \quad (15)$$

As in the 1D test, for a given significance level $\alpha$ or a threshold value $\tau$, using $\hat{D}$ in equation (15), the hardware processor can then test to approve or disapprove the hypothesis $H_0$.

Figure 2:
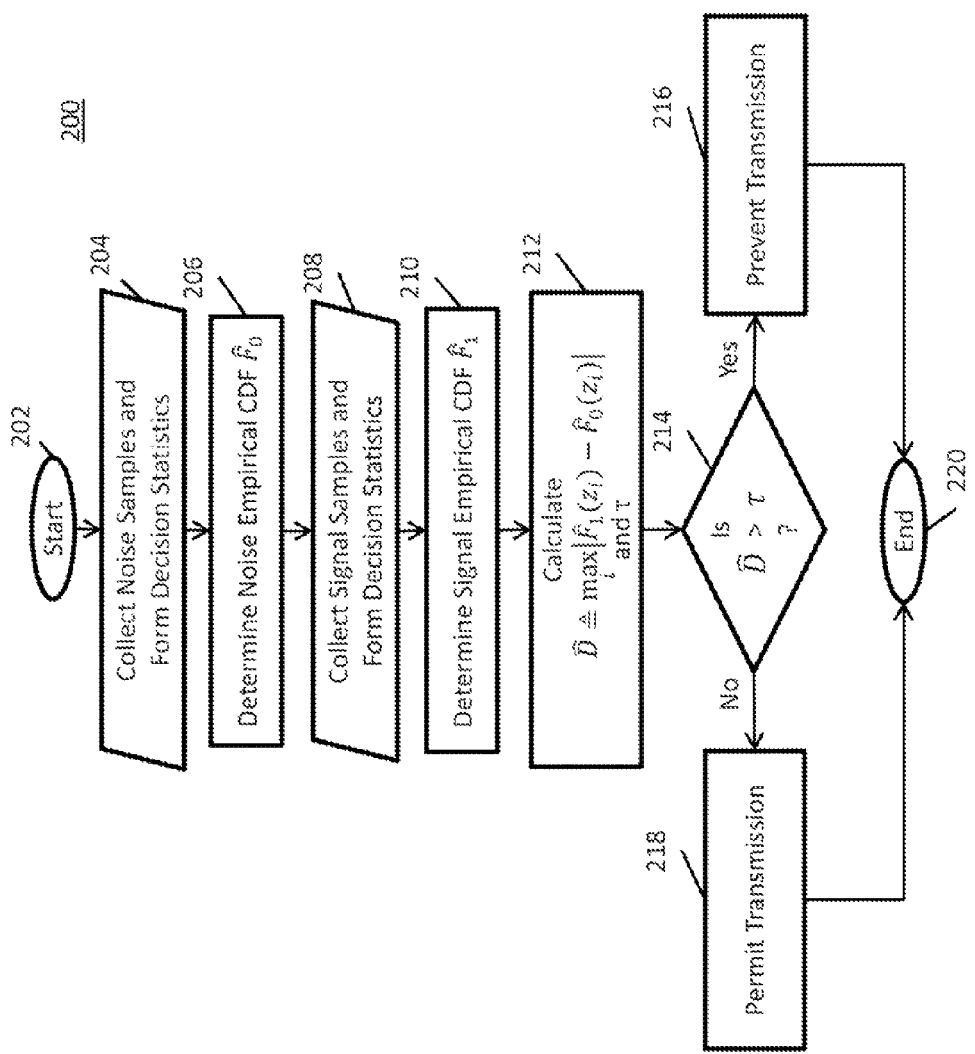
FIG. 2 is a flow diagram of an example of a process for detecting usage of a radio channel using a single stage test in accordance with some embodiments.

Turning to FIG. 2, an example process 200 for determining whether a primary transceiver is using a radio channel that can be implemented by hardware processor 122 in accordance with some embodiments is shown.

As described above, this process uses empirical cumulative distribution function (CDF) calculations based on decision statistics $\{z_n\}$. Any suitable decision statistics can be used to calculate the CDFs. For example, in some embodiments, because the received signals in (1) and (2) are complex-valued, the decision statistics $\{z_n\}$ can be formed based on any of various combinations a signal characteristic (e.g., signal amplitude, signal quadrature, etc.) and a K-S detector dimensionality (e.g., one dimension (1D), two dimensions (2D), etc.). For example, in some embodiments, the decision statistics can be formed based on a magnitude-based, 1D K-S detector from M received signal vectors $\{y[n], n=1, \ldots, M\}$, so that $M \cdot N_r$ decision statistics can be obtained as:

$$z_{2(n-1)N_r+j} = |y_j[n]|, j=1,\ldots,N_r; n=1,\ldots,M \quad (16)$$

As another example, in some embodiments, the decision statistics can be formed based on a quadrature-based, 1D K-S detector from M received signal vectors $\{y[n], n=1, \ldots, M\}$, so that $2 \cdot M \cdot N_r$ decision statistics can be obtained as:

$$z_{2[(n-1)N_r+j]} = \Re\{y_j[n]\}, z_{2[(n-1)N_r+j]+1} = \Im\{y_j[n]\}),$$
$$j=1,\ldots,N_r; n=1,\ldots,M. \quad (17)$$

As yet another example, in some embodiments, the decision statistics can be formed based on a quadrature-based, 2D K-S detector from M received signal vectors $\{y[n], n=1, \ldots, M\}$, so that $M \cdot N_r$ decision statistic pairs can be obtained as:

$$z_{(n-1)N_r+j} = (\Re\{y_j[n]\}, \Im\{y_j[n]\}), j=1, \ldots, N_r; n=1, \ldots, M. \quad (18)$$

As illustrated, after process 200 begins at 202, hardware processor 122 can obtain noise statistics by collecting $M_0$ noise-only sample vectors $\{v[n], n=1, \ldots, M_0\}$ and form the corresponding decision statistics (e.g., amplitude or quadrature statistics) $\{\xi_n\}$ at 204. These noise-only samples can be collected in any suitable manner and any suitable number of samples can be collected. For example, these samples may be collected from IQ data 124 at a time when it is known that no primary transceiver is using the radio channel.

Then, at 206, the hardware processor can then compute the empirical 1D or 2D noise empirical CDF $\hat{F}_0$, as described above.

Next, hardware processor 122 can collect M received signal sample vectors $\{y[n], n=1, \ldots, M\}$ and form the corresponding decision statistics (e.g., amplitude or quadrature statistics) $\{z_n\}$ at 208. These signal samples can be collected in any suitable manner and any suitable number of samples can be collected. For example, these samples may be collected from IQ data 124 at a time when a primary transceiver may or may not be using the radio channel.

The hardware processor can then compute the empirical 1D or 2D cdf $\hat{F}_1$, as described above, at 210.

At 212, hardware processor 122 can next compute the maximum difference $\hat{D}$ in equation (7), and the threshold $\tau$ based on the given false alarm rate $\alpha$ using equation (8) and equation (11), as described above. If $\hat{D} > \tau$, then the hardware processor can determine at 214 that a primary transceiver is using the radio channel and prevent secondary transceiver 112 from transmitting on the channel at 216. Otherwise, the hardware processor 122 can determine at 214 that no primary transceiver is using the radio channel and cause the secondary transceiver to transmit on the channel at 218. After 216 or 218, process 200 can terminate at 220.

It should be understood that some of the above steps of the flow diagram of FIG. 2 can be executed or performed in an order or sequence other than the order and sequence shown and described in the figure. Also, some of the above steps of the flow diagram of FIG. 2 may be executed or performed well in advance of other steps, or may be executed or performed substantially simultaneously or in parallel to reduce latency and processing times.

In accordance with some embodiments, instead of using a fixed number of samples for each decision, a decision can be made based on a number of samples that varies based on conditions. For example, in some embodiments, with each new detected sample, the empirical CDF $\hat{F}_1$ can be updated and the K-S statistic reevaluated. More particularly, for example, a sequential K-S test can be formed by concatenating P K-S tests, starting with q samples and adding q samples at each subsequent stage up to P stages, where P is the truncation point of the test.

Figure 3:
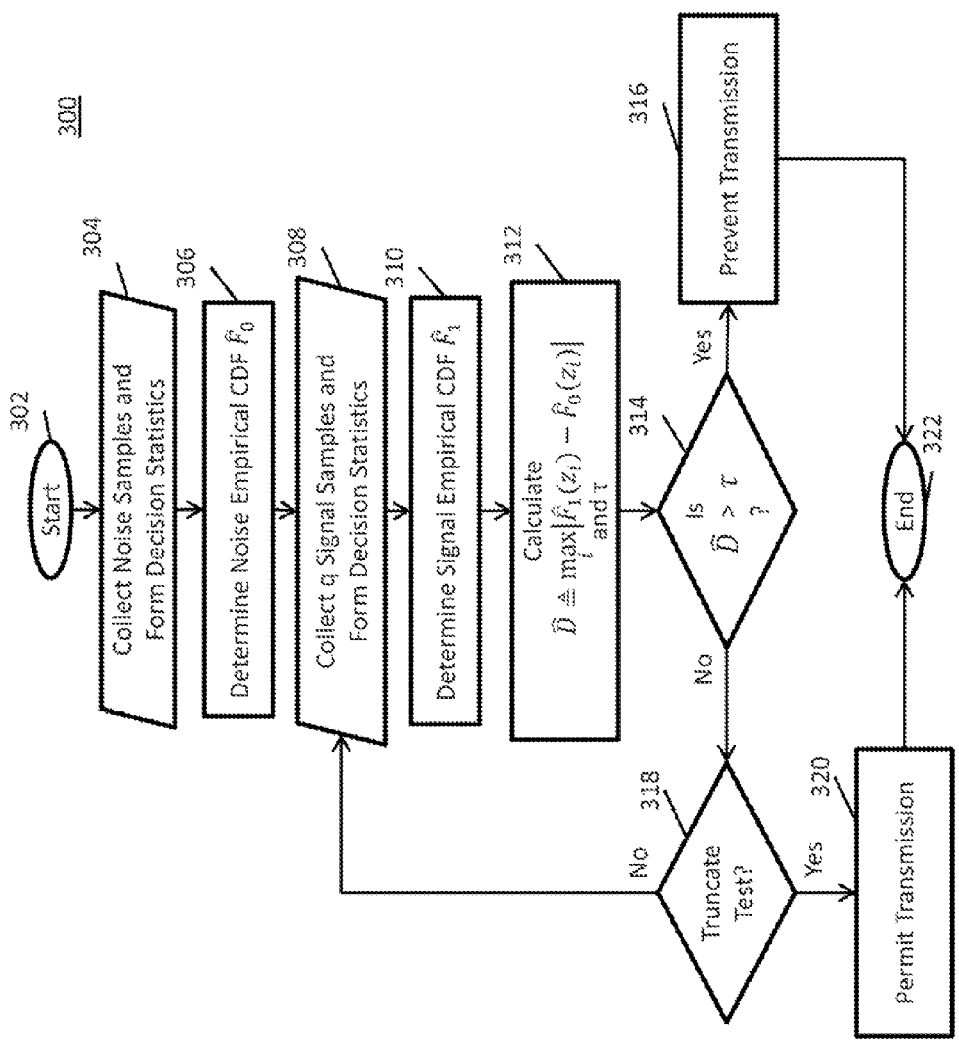
FIG. 3 is a flow diagram of an example of a process for detecting usage of a radio channel using a multiple stage test in accordance with some embodiments.

FIG. 3 illustrates an example process 300 for determining whether a primary transceiver is using a radio channel that can be implemented by hardware processor 122 in accordance with some embodiments.

As shown, after process 300 begins at 302, hardware processor 122 can obtain noise statistics by collecting $M_0$ noise-only sample vectors $\{v[n], n=1, \ldots, M_0\}$ and form the corresponding decision statistics (e.g., amplitude or quadrature statistics) $\{\xi_n\}$ at 304. These noise-only samples can be collected in any suitable manner and any suitable number of samples can be collected. For example, these samples may be collected from IQ data 124 at a time when it is known that no primary transceiver is using the radio channel.

Then, at 306, the hardware processor can then compute the empirical 1D or 2D noise empirical CDF $\hat{F}_0$, as described above.

Next, hardware processor 122 can collect M=q received signal sample vectors $\{y[n], n=1, \ldots, M\}$ and form the corresponding decision statistics (e.g., amplitude or quadrature statistics) $\{z_n\}$ at 308. These signal samples can be collected in any suitable manner and any suitable number of samples can be collected. For example, these samples may be collected from IQ data 124 at a time when a primary transceiver may or may not be using the radio channel.

The hardware processor can then compute the signal empirical 1D or 2D CDF $\hat{F}_1$, as described above, at 310.

At 312, hardware processor 122 can next compute the maximum difference $\hat{D}$ in equation (7) and the threshold $\tau$ using equation (8) and equation (11). However, unlike what is described above wherein $\tau$ is calculated based on the false alarm rate $\alpha$ of the overall single stage test, here $\tau$ is calculated based on the false alarm probability $\beta$ of each stage of the P stage test (by substituting $\alpha$ with $\beta$ in equations (8) and (11)) in order to meet the overall false alarm rate $\alpha$, where $\beta$ can be calculated using equation (19):

$$\beta = 1 - \sqrt[P]{1-\alpha} \quad (19)$$

based on the overall false alarm rate $\alpha$ being represented by the following equation:

$$\alpha = \beta + (1-\beta)\beta + (1-\beta)^2\beta + \ldots + (1-\beta)^{P-1}\beta = 1-(1-\beta)^P. \quad (20)$$

If $\hat{D} > \tau$, then the hardware processor can determine at 314 that a primary transceiver is using the radio channel and prevent secondary transceiver 112 from transmitting on the channel at 316. Otherwise, hardware processor 122 can branch from 314 to 318 to determine whether to truncate the test. The test may be truncated for any suitable reason. For example, in some embodiments, the test may be truncated after a certain number if loops, comparisons of the largest absolute difference to the threshold, etc. If so, the processor can determine that no primary transceiver is using the radio channel and cause the secondary transceiver to transmit on the channel at 320. After 316 or 320, process 300 can terminate at 322.

It should be understood that some of the above steps of the flow diagram of FIG. 3 can be executed or performed in an order or sequence other than the order and sequence shown and described in the figure. Also, some of the above steps of the flow diagram of FIG. 3 may be executed or performed well in advance of other steps, or may be executed or performed substantially simultaneously or in parallel to reduce latency and processing times.

In some embodiments, any suitable computer readable media can be used for storing, instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for detecting usage of a radio channel comprising:
   (a) collecting noise samples on the radio channel from a radio receiver;
   (b) determining a noise empirical cumulative distribution function using a hardware processor;
   (c) collecting signal samples on the radio channel from the radio receiver;
   (d) determining a signal empirical cumulative distribution function using a hardware processor;
   (e) calculating a largest absolute difference between the noise empirical cumulative distribution function and the signal empirical cumulative distribution function using a hardware processor; and
   (f) determining that the radio channel is being used when the largest absolute difference is greater than a threshold using a hardware processor.

2. The method of claim 1, wherein the radio receiver is part of a transceiver.

3. The method of claim 1, wherein the radio channel is a MIMO channel.

4. The method of claim 1, further comprising forming decision statistics for the noise samples and the signal samples based on amplitude characteristics.

5. The method of claim 1, further comprising forming decision statistics for the noise samples and the signal samples based on quadrature characteristics.

6. The method of claim 1, further comprising repeating (c), (d), (e), and (f) when the largest absolute difference is not greater than a threshold using a hardware processor.

7. The method of claim 6, further comprising determining whether a given number of comparisons of a largest absolute difference value to the threshold has been performed before repeating (c), (d), (e), and (f).

8. A system for detecting usage of a radio channel comprising:
   a radio receiver; and
   at least one hardware processor that:
   (a) collects noise samples on the radio channel from the radio receiver;
   (b) determines a noise empirical cumulative distribution function;
   (c) collects signal samples on the radio channel from the radio receiver;
   (d) determines a signal empirical cumulative distribution function;
   (e) calculates a largest absolute difference between the noise empirical cumulative distribution function and the signal empirical cumulative distribution function; and
   (f) determines that the radio channel is being used when the largest absolute difference is greater than a threshold.

9. The system of claim 8, wherein the radio receiver is part of a transceiver.

10. The system of claim 8, wherein the radio channel is a MIMO channel.

11. The system of claim 8, wherein the at least one hardware processor also forms decision statistics for the noise samples and the signal samples based on amplitude characteristics.

12. The system of claim 8, wherein the at least one hardware processor also forms decision statistics for the noise samples and the signal samples based on quadrature characteristics.

13. The system of claim 8, wherein the at least one hardware processor also repeats (c), (d), (e), and (f) when the largest absolute difference is not greater than a threshold.

14. The system of claim 13, wherein the at least one hardware processor also determines whether a given number of comparisons of a largest absolute difference value to the threshold has been performed before repeating (c), (d), (e), and (f).

15. A non-transitory computer-readable medium containing computer-executable instructions that, when executed by a processor, cause the processor to perform a method for detecting usage of a radio channel, the method comprising:
   (a) collecting noise samples on the radio channel from a radio receiver;
   (b) determining a noise empirical cumulative distribution function;
   (c) collecting signal samples on the radio channel from the radio receiver;
   (d) determining a signal empirical cumulative distribution function;
   (e) calculating a largest absolute difference between the noise empirical cumulative distribution function and the signal empirical cumulative distribution function; and
   (f) determining that the radio channel is being used when the largest absolute difference is greater than a threshold.

16. The non-transitory computer-readable medium of claim 15, wherein the radio receiver is part of a transceiver.

17. The non-transitory computer-readable medium of claim 15, wherein the radio channel is a MIMO channel.

18. The non-transitory computer-readable medium of claim 15, wherein the method further comprises forming decision statistics for the noise samples and the signal samples based on amplitude characteristics.

19. The non-transitory computer-readable medium of claim 15, wherein the method further comprises forming decision statistics for the noise samples and the signal samples based on quadrature characteristics.

20. The non-transitory computer-readable medium of claim 15, wherein the method further comprises repeating (c), (d), (e), and (f) when the largest absolute difference is not greater than a threshold.

21. The non-transitory computer-readable medium of claim 20, wherein the method further comprises determining whether a given number of comparisons of a largest absolute difference value to the threshold has been performed before repeating (c), (d), (e), and (f).

* * * * *